United States Patent
Bruce et al.

[11] Patent Number: 5,822,251
[45] Date of Patent: Oct. 13, 1998

[54] EXPANDABLE FLASH-MEMORY MASS-STORAGE USING SHARED BUDDY LINES AND INTERMEDIATE FLASH-BUS BETWEEN DEVICE-SPECIFIC BUFFERS AND FLASH-INTELLIGENT DMA CONTROLLERS

[75] Inventors: Ricardo H. Bruce, Union City; Rolando H. Bruce, South San Francisco; Earl T. Cohen, Fremont, all of Calif.

[73] Assignee: Bit Microsystems, Inc., Fremont, Calif.

[21] Appl. No.: 939,601

[22] Filed: Sep. 29, 1997

Related U.S. Application Data

[63] Continuation-in-part of Ser. No. 918,203, Aug. 25, 1997.

[51] Int. Cl.[6] .................................................. G11C 13/00
[52] U.S. Cl. ............................... 365/185.33; 365/189.01; 365/218
[58] Field of Search ......................... 365/189.01, 230.01, 365/185.33, 218

[56] References Cited

U.S. PATENT DOCUMENTS

| | | | |
|---|---|---|---|
| 4,752,871 | 6/1988 | Sparks | 365/189.01 |
| 5,297,148 | 3/1994 | Harari et al. | 371/10.2 |
| 5,379,401 | 1/1995 | Robinson et al. | 395/425 |
| 5,388,083 | 2/1995 | Assar et al. | 365/218 |
| 5,432,748 | 7/1995 | Hsu et al. | 365/230.01 |
| 5,448,577 | 9/1995 | Wells et al. | 371/10.1 |
| 5,479,638 | 12/1995 | Assar et al. | 395/430 |
| 5,500,826 | 3/1996 | Hsu et al. | 365/230.01 |
| 5,509,134 | 4/1996 | Fandrich et al. | 395/430 |
| 5,513,138 | 4/1996 | Manabe et al. | 365/185.33 |
| 5,524,231 | 6/1996 | Brown | 395/428 |
| 5,530,828 | 6/1996 | Kaki et al. | 395/430 |
| 5,535,328 | 7/1996 | Harari et al. | 395/182.05 |
| 5,559,956 | 9/1996 | Sukegawa | 395/182.06 |
| 5,568,439 | 10/1996 | Harari | 365/218 |
| 5,572,466 | 11/1996 | Sukegawa | 365/185.33 |
| 5,594,883 | 1/1997 | Pricer | 395/440 |
| 5,602,987 | 2/1997 | Harari et al. | 395/182.06 |
| 5,603,001 | 2/1997 | Sukegawa et al. | 395/430 |
| 5,606,529 | 2/1997 | Honma et al. | 365/230.01 |
| 5,619,470 | 4/1997 | Fukumoto | 365/228 |
| 5,627,783 | 5/1997 | Miyauchi | 365/185.33 |
| 5,640,349 | 6/1997 | Kakinuma et al. | 365/185.33 |

*Primary Examiner*—Terrell W. Fears
*Attorney, Agent, or Firm*—Stuart T. Auvinen

[57] ABSTRACT

A flash-memory system is expandable. Rather than directly connecting individual flash-memory chips to a controller, flash buffer chips are used. Each flash buffer chip can connect to four banks of flash-memory chips. Chip enables for individual chips in a bank are generated from an address sent to the flash buffer chips. Two flash-specific DMA controllers are provided, each with four DMA state machines for controlling the four banks of flash-memory chips attached to a flash buffer chip. This allows for four-way interleaving. Two flash buses connect the two DMA controllers to flash buffer chips. The flash bus has a narrow byte-wide interface to send command, address, and data bytes from the DMA controller to the flash buffer chips. These command, address, and data bytes are then passed through the flash buffer chip to the flash-memory chips. Two additional command signals on the flash bus are used to select and control the flash buffer chips. Busy signals from all flash-memory chips in a bank are connected together, and the four busy signals from the four banks are time-multiplexed to a single common busy line for the flash bus. The four DMA state machines each monitor one period of the busy line, allowing four flash operations to be monitored at a time, even though only one data transfer can occur across the flash bus.

24 Claims, 8 Drawing Sheets

EXPANDABLE FLASH-MEMORY MASS-STORAGE USING SHARED BUDDY LINES AND INTERMEDIATE FLASH-BUS BETWEEN DEVICE-SPECIFIC BUFFERS AND FLASH-INTELLIGENT DMA CONTROLLERS

RELATED APPLICATION

This application is a continuation-in-part of the co-pending application for "Unified Re-Map and Cache-Index Table with Dual Write-Counters for Wear-Leveling of Non-Volatile Flash RAM Mass Storage", filed Aug. 25, 1997, U.S. Ser. No. 08/918,203.

BACKGROUND OF THE INVENTION

1. Field of the Invention

This invention relates to non-volatile memory storage systems, and more particularly to expansion of flash memory systems.

2. Description of the Related Art

Hard disks have been the traditional storage medium in computer systems. More recently these hard disks are being replaced by non-volatile semiconductor memory. An array of non-volatile random-access memories (NVRAM's) or non-volatile flash memories substitutes for the hard-disk storage. These memory devices use electrically-erasable programmable read-only-memory (EEPROM) technology for storage cells. Floating polysilicon gates in these storage cells retain charge and state when power is lost, providing non-volatile storage. These flash-memory systems are frequently used as a mass-storage replacement for a hard disk on a personal computer and are thus sometimes referred to as a flash "disk", even though no rotating disks are used.

Hard disks suffer from their inherent fixed size, since expansion of the storage capacity of a hard disk is not possible. An entire new disk assembly is needed to expand disk storage. Like DRAM memory, flash memory has the potential for expansion. However, current flash-memory systems have not fully realized the potential for expandability. Rigid bus architectures often restrict expansion of flash-memory systems. Like hard disks, the expansion of these flash-memory systems is limited.

Slow Flash Operations

Flash EEPROM chips are divided into pages and blocks. A 64 Mbit flash chip typically has 512-byte pages which happens to match the sector size for IDE and SCSI hard disks. Rather than writing to or reading from just one word in the page, the entire page must be read or written at the same time; individual bytes cannot be written. Thus flash-memory operations are inherently slow since an entire page must be read or written.

Each page must be cleared of any previous data before being written; clearing is accomplished by a flash erase cycle. An entire block of pages (typically 16 pages) is erased at once. A block of 16 pages must be erased together, while all 512 bytes on a page must be written together. Erase is therefore significantly slower than read or write operations.

Interleaving on a page basis increases the effective block size since several banks are grouped together. For example, a 4:1 page-interleaved system has an effective block size of 4 blocks. The larger block size can further increase erase time. Interleaving is preferably done on a block basis that doesn't increase the effective block size.

A busy signal is usually provided by each flash-memory chip to indicate when the read, write, or erase operation has completed. The busy signal allows a local processor to continue with other tasks while the flash-memory integrated circuit chip performs the flash operation. Flash operations generally cannot be stopped once initiated. Erase operations are the exception—they can be suspended and resumed later, but generally only one erase operation per flash-memory chip can be active or suspended at a time.

Busy signals complicate expansion, as the local processor must receive all the busy signals. As more flash-memory devices are added to the system, the local processor must receive additional busy signals from the additional chips. While all the busy signals can be connected together, this can limit performance as parallel flash operations driving the same busy line can interfere with each other, requiring that the local processor read status registers on all the flash chips when any device asserts the common busy line. Connecting all the busy signals together generally also means that the busy line will stay asserted (busy) as long as any device is busy—this limits parallelism by not providing separate indications of when each flash-memory chip has completed an operation.

DMA for Data Transfers

Direct-memory access (DMA) has been used to facilitate data transfers. While DMA is efficient for transfers of raw data to a memory, flash-memory chips also require command and address sequences to set up the relatively long flash operations. DMA is not well-suited to transfer addresses and commands since it is designed to transfer long strings of data beginning at a starting address through an ending address.

These command and address sequences are inputted to the flash-memory chips through shared data I/O pins, and generally require special control signals to be asserted to distinguish whether the shared data I/O pins contain data, address, or command information. Often only 8 data I/O pins are provided, limiting transfers to one byte of a command, address, or data per cycle. Thus one or two cycles are needed for each command and two or three cycles are needed for each address inputted to the flash-memory chips.

It is desired to modify a DMA controller so that commands and addresses can also be input to a flash-memory chip over the shared data/address/command I/O pins. It is also desired to allow for expansion of storage capacity of a flash-memory system. A high-performance flash-memory system performing flash operations in parallel is desirable, even when expansion flash chips are added.

SUMMARY OF THE INVENTION

An expandable flash-memory system has a host interface that receives requests for access of flash memory. A flash-specific direct-memory access (DMA) controller controls access of the flash memory. The flash-specific DMA controller generates a sequence of command bytes followed by address bytes to initiate a data transfer from the flash memory.

A flash bus is coupled to the flash-specific DMA controller. The flash bus has shared lines that transmit the sequence of command bytes and address bytes from the flash-specific DMA controller. The shared lines also transmit data bytes from the flash-specific DMA controller for the host interface.

Flash buffer chips are coupled to the flash bus. They generate control signals that control flash-memory chips. The flash buffer chips pass the sequence of command bytes and address bytes from the flash-specific DMA controller to the flash memory.

A plurality of flash-memory chips are arranged in banks that share some of the control signals from a flash buffer chip. The flash-memory chips are non-volatile semiconductor-memory chips that retain data when power is no longer applied.

The flash bus accepts additional flash-memory chips attached through the flash buffer chips to expand a storage capacity of the expandable flash-memory system. Thus the flash-memory chips are buffered by the flash buffer chips to the flash bus and the flash-specific DMA controller.

In further aspects of the invention the flash bus has command lines to indicate transmission of a select code to the flash buffer chips. The flash buffer chips each have a select decoder that receives the select code. Each flash buffer chip generates a plurality of chip-enable control signals to the flash-memory chips. One of the chip-enable control signals is activated to enable a selected flash-memory chip while other chip-enable control signals disable other flash-memory chips. Thus the chip-enable control signals are generated by the flash buffer chips from the select code from the flash-specific DMA controller.

In further aspects of the invention each flash-memory chip outputs a busy signal to indicate when a flash operation is in progress within the flash-memory chip. All busy signals from flash-memory chips in a bank that is connected to a flash buffer chip are connected to a common bank-busy line. The bank-busy line for each bank is input to the flash buffer chip.

The flash buffer chip also has a busy combining means that receives the bank-busy signals from all banks of flash-memory chips attached to the flash buffer chip. It combines the bank-busy signals into a merged busy signal output to the flash bus. Thus busy signals from individual flash-memory chips are combined by the flash buffer chips.

In still further aspects the merged busy signals from all flash buffer chips on the flash bus are connected to a common flash-bus busy line. The flash-specific DMA controller monitors the common flash-bus busy line to determine when the flash operation is in progress in the flash-memory chip. Thus all busy signals are combined into a single busy line to the flash-specific DMA controller.

In further aspects of the invention a second flash bus is coupled to a second flash-specific DMA controller. A second plurality of flash buffer chips are coupled to the second flash bus. Each flash buffer chip in the second plurality generates control signals and buffers command and address bytes from the second flash bus to additional banks of flash buffer chips. Thus the second flash bus accesses the additional banks of flash buffer chips.

In other aspects of the invention a flash-memory storage peripheral has a host interface to a host system and a local processor that controls the flash-memory storage peripheral. A read-only memory (ROM) is coupled to the local processor. It stores routines for execution by the local processor. The routines include wear-leveling routines for re-mapping data from over-used or faulty memory blocks to unused memory blocks.

A cache is coupled to the local processor. It temporarily stores data from the host in volatile memory that loses data when power is disconnected. A first flash-specific DMA controller is coupled to the local processor. It generates command, address, and data sequences to a first flash-memory chip in a format required by the first flash-memory chip. A first flash bus is coupled to the first flash-specific DMA controller. It transfers data, addresses, and commands over shared address/data/command lines. A first flash buffer chip is coupled to the first flash bus. It sends the data, addresses, and commands from the shared lines of the first flash bus to the first flash-memory chip.

A plurality of other flash-memory chips are arranged into banks. The flash-memory chips are non-volatile semiconductor memory chips that retain data when power is lost. Other flash buffer chips are coupled to the first flash bus. Each flash buffer chip is coupled to a different plurality of banks of the flash-memory chips.

A second flash-specific DMA controller is coupled to the local processor. It generates command, address, and data sequences to a second flash-memory chip in a format required by the second flash-memory chip. A second flash bus is coupled to the second flash-specific DMA controller. It transfers the data, addresses, and commands over shared address/data/command lines. A second flash buffer chip is coupled to the second flash bus. It sends the data, addresses, and commands from the shared lines of the second flash bus to the second flash-memory chip. Other flash buffer chips are coupled to the second flash bus. Each flash buffer chip is coupled to a different plurality of banks of the flash-memory chips. Thus two flash-specific DMA controllers control access of flash-memory chips through flash buffer chips connected by two flash buses.

DETAILED DESCRIPTION

The present invention relates to an improvement in flash-memory systems. The following description is presented to enable one of ordinary skill in the art to make and use the invention as provided in the context of a particular application and its requirements. Various modifications to the preferred embodiment will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed.

An expandable flash-memory system uses multiple levels of busses. The flash-memory chips are buffered from an intermediate flash bus by flash buffer chips that combine busy signals from an array of flash-memory chips. Flash-specific direct-memory access (DMA) drives commands, addresses, and data out over the flash bus.

Figure 1:
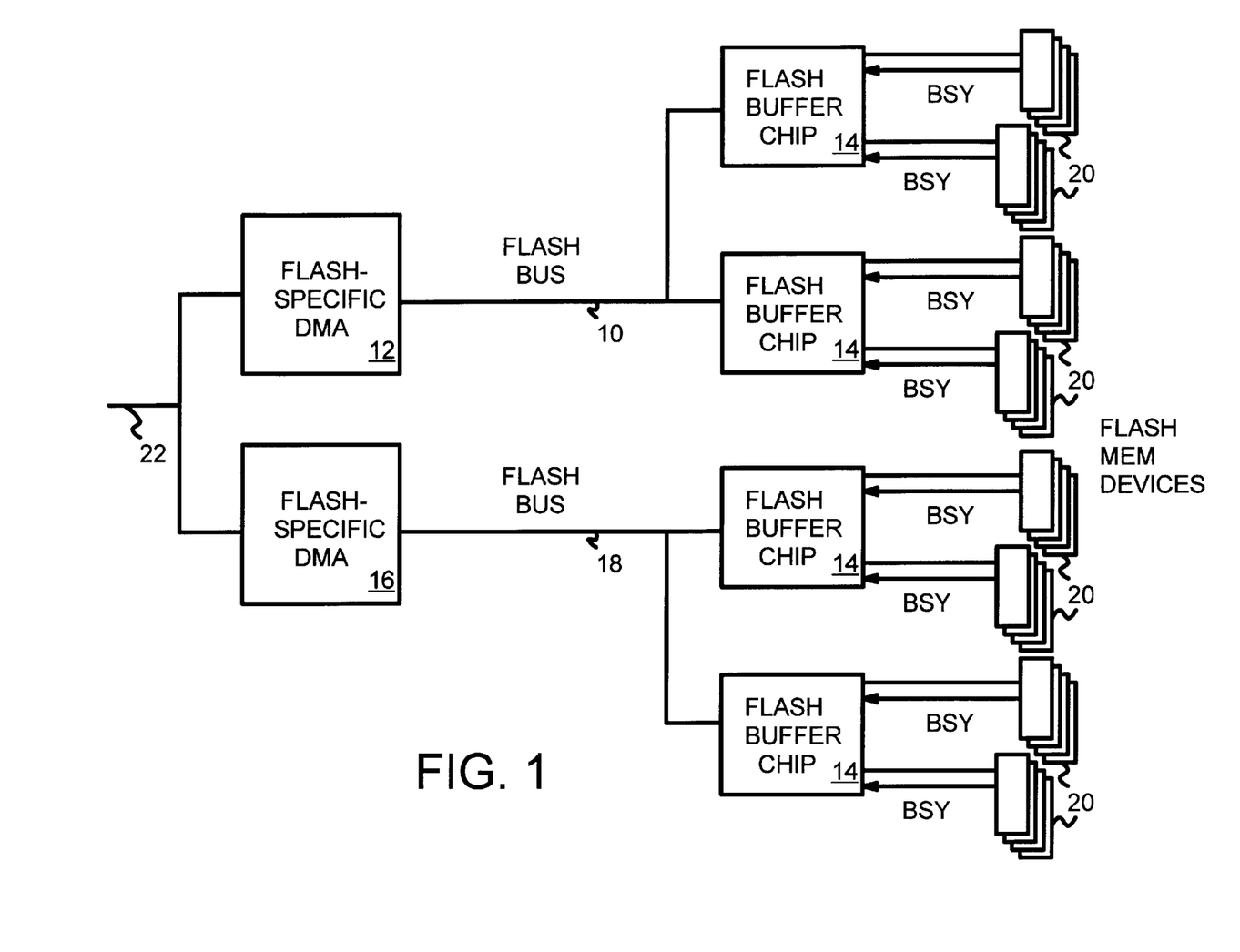
FIG. 1 is a block diagram of a large flash-memory system with dual DMA controllers driving dual flash busses.

FIG. 1 is a block diagram of a large flash-memory system with dual DMA controllers driving dual flash busses. High-level requests from a local processor are sent to flash memory over bus 22. Each request is translated into a sequence of commands, address bytes, and data transfers by one of the flash-specific DMA controllers 12, 16. DMA controllers 12, 16 transfer not only data, as in traditional DMA, but also generate the appropriate command and address bytes that are transmitted over the same lines of the flash bus as the data.

Commands, address bytes, and data bytes are transferred from DMA controller 12, 16 to flash-memory chips 20 over flash busses 10, 18, which have 8 multiplexed data/address/command lines. In addition to the 8 shared data/address/command lines, flash busses 10, 18 also have 2 lines for an encoded command. This 2-bit encoded command is not sent to flash-memory chips 20, but is instead used to select and control flash buffer chips 14. Thus each flash bus has an 8-bit portion destined for flash buffer chips 14 or for flash-memory chips 20, and a 2-bit portion sent only for flash buffer chips 14.

DMA controller 12 drives flash bus 10, while DMA controller 16 drives second flash bus 18. Flash busses 10, 18 can operate at the same time, allowing flash operations to be initiated and processed in parallel. Each flash buffer chip 14 can control several banks of flash-memory chips 20. Each bank can be separately accessed, allowing many flash operations to be performed in parallel.

The busy signals from all flash-memory chips in a bank are connected together, so only one flash-memory chip in a bank can be active at a time. However, each flash buffer chip 14 receives separate busy signals from each separate bank; in FIG. 1, each flash buffer chip 14 has two banks attached and receives two separate busy signals. A preferred embodiment has four banks attached to each flash buffer chip 14. Each bank has eight flash memory chips.

An expandable architecture is provided by flash busses 10, 18. Additional banks of flash-memory chips can be added to existing flash buffer chips, or modules of flash-memory chips with a flash buffer chip can be plugged into a flash bus. The flash bus is an intermediate bus that facilitates expansion since any number of flash buffer chips can be added.

Performance is enhanced because two DMA controllers are provided, able to launch two new flash operations at once. Once launched, flash operations are monitored by the flash buffer chips, which receive the busy lines from the flash-memory chips. Thus the DMA controller can launch additional flash operations to other flash-memory chips. This inherent parallelism improves performance by allowing multiple flash operations to be performed at the same time. Indeed, multiple flash operations can be launched or completed at the same time since two DMA controllers are provided.

Figure 2:
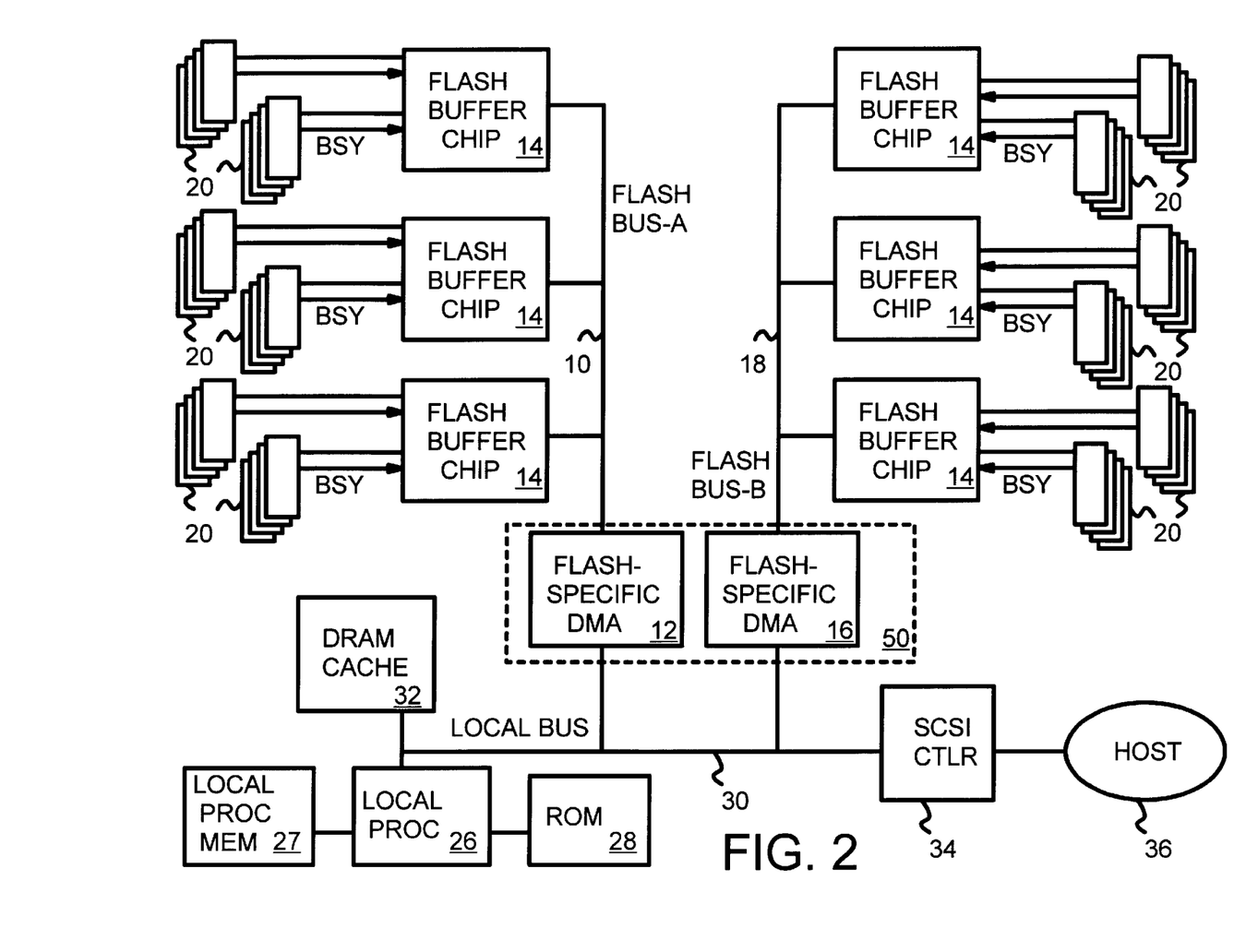
FIG. 2 is an expandable flash-disk system using dual DMA and dual flash busses.

Expandable Flash-Disk System—FIG. 2

FIG. 2 is an expandable flash-disk system using dual DMA and dual flash busses. Banks of flash-memory chips 20 connect to flash buffer chips 14, which are connected to flash busses 10, 18. Expansion occurs when additional flash buffer chips are connected to flash busses 10, 18. Since relatively few flash buffer chips are connected to each flash bus, loading from additional chips is not critical. A great many flash-memory chips can be added since each flash buffer chip can connect to four banks of 8 flash-memory chips, a total of 32 flash-memory chips per flash buffer chip.

Flash specific DMA controllers 12, 16 are preferably contained in a single Application-Specific Integrated Circuit (ASIC) 50. ASIC 50 connects DMA controllers 12, 16 to local bus 30. Local bus 30 connects DRAM cache 32, local processor 26, and small-computer system interface (SCSI) controller 34 to DMA controllers 12, 16.

Requests from host 36 are received by SCSI controller 34 and driven onto local bus 30. Local processor 26 responds to these host requests by storing host data into DRAM cache 32 for writes, or reading data from flash-memory chips 20 or from DRAM cache 32 for reads. ROM 28 contains firmware code of routines that execute on local processor 26 to respond to host requests. Other system-maintenance routines are stored on ROM 28, such as wear-leveling and copy-back routines. DRAM cache 32 is preferably under firmware control by local processor 26, and thus the local processor's local memory 27 and DRAM cache 32 may share the same physical DRAM chips.

Accesses of flash-memory chips 20 by local processor 26 are initiated by local processor 26 sending a high-level command to one of flash-specific DMA controllers 12, 16. These DMA controllers then generate sequences of command and address bytes, and transfer data. Many sequences may be needed, such as for block reads and writes. A block read requires that many page read sequences be performed, each sequence generally sending command and address bytes to the flash-memory chips through the flash buffer chips. Some flash-memory chips also have a sequential read mode where command and address bytes need only be sent for the first page in a sequence.

The flash-memory chips being read, written, or erased remain busy for some period of time after the command and address bytes are sent. The flash buffer chips combine and send the busy signals from multiple flash-memory chips to the DMA controller. Once the busy signal is de-asserted, indicating that the flash-memory chip is ready, the DMA controller continues the operation, perhaps reading the data or moving on to the next page in the block. Finally, once all flash operations have finished, the DMA controller signals to local processor 26 that the high-level flash operation is complete.

Figure 3:
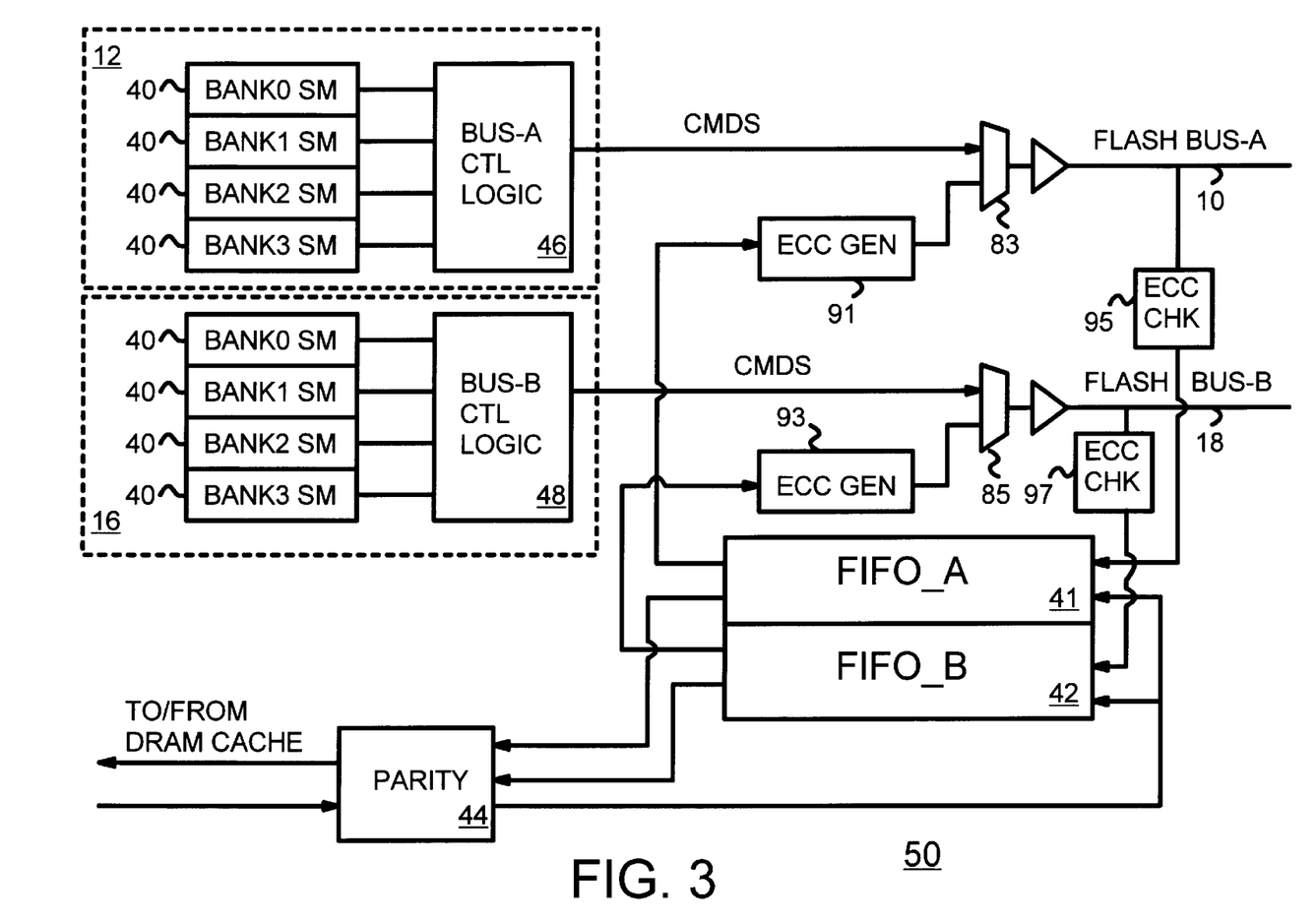
FIG. 3 is a diagram of an ASIC chip containing dual DMA controllers modified for controlling flash memories.

Flash-Specific DMA—FIG. 3

FIG. 3 is a diagram of an ASIC chip containing dual DMA controllers modified for controlling flash memories. Data received from flash busses 10, 18 is buffered by FIFOs 41, 42 before being sent to the DRAM cache. Having separate FIFOs 41, 42 for flash busses 10, 18 allows for independent bus operation. One flash bus can be reading from flash-memory chips while the other is writing to flash-memory chips. Flash data is always sent to and from the DRAM cache rather than directly from the host to the flash memory. Parity circuit 44 adds or checks parity bits for storage in the DRAM cache. FIFOs 41, 42 also buffer data from the host or DRAM cache before it is written to the flash memory over one of flash busses 10, 18.

Flash bus 10 is controlled by flash-specific DMA controller 12, while flash bus 18 is controlled by flash-specific DMA controller 16. Each DMA controller 12, 16 contains four state machines 40, one for each of four banks of flash-memory chips. Having four state machines allows four flash-memory chips to be accessed at once for each flash bus, for a total of eight flash accesses. The data can be interleaved among the four banks for each flash buffer chip, and also interleaved among chips connected to the two flash busses. Separate state machines 40 allow the eight flash accesses to be in different stages of completion.

Flash bus 10 is driven by bus control logic 46 in DMA controller 12, while flash bus 18 is driven by bus control logic 48 in DMA controller 16. Bus control logic 46, 48 generates command and address bytes or enables reading and writing of FIFOs 41, 42 in response to states entered by state machines 40. Arbitration logic (not shown) determines which state machine 40 currently controls each flash bus, since only one transfer at a time can be performed on a flash bus.

Multiplexers or muxes 83, 85 select address bytes and commands from bus control logic 46, 48, or data from FIFOs 41, 42. This allows both commands and data to be sent over the same flash bus.

Error-correcting-code (ECC) generators 91, 93 and ECC checkers 95, 97 connect to flash busses 10, 18. A block code, such as a Reed-Solomon code, is used to protect entire pages of data stored in the flash-memory chips and to guard against more than just simple, single-bit errors. When data is being transferred to the flash-memory chips, ECC generators 91, 93 generate ECC, and when data is being transferred from the flash-memory chips, ECC checkers 95, 97 check the ECC and determine if there were any errors, either in the flash-memory chips themselves, or possibly in the interface to or from them. It is possible to design a combined ECC generator/checker unit so that one ECC unit can be used per flash bus.

Figure 4:
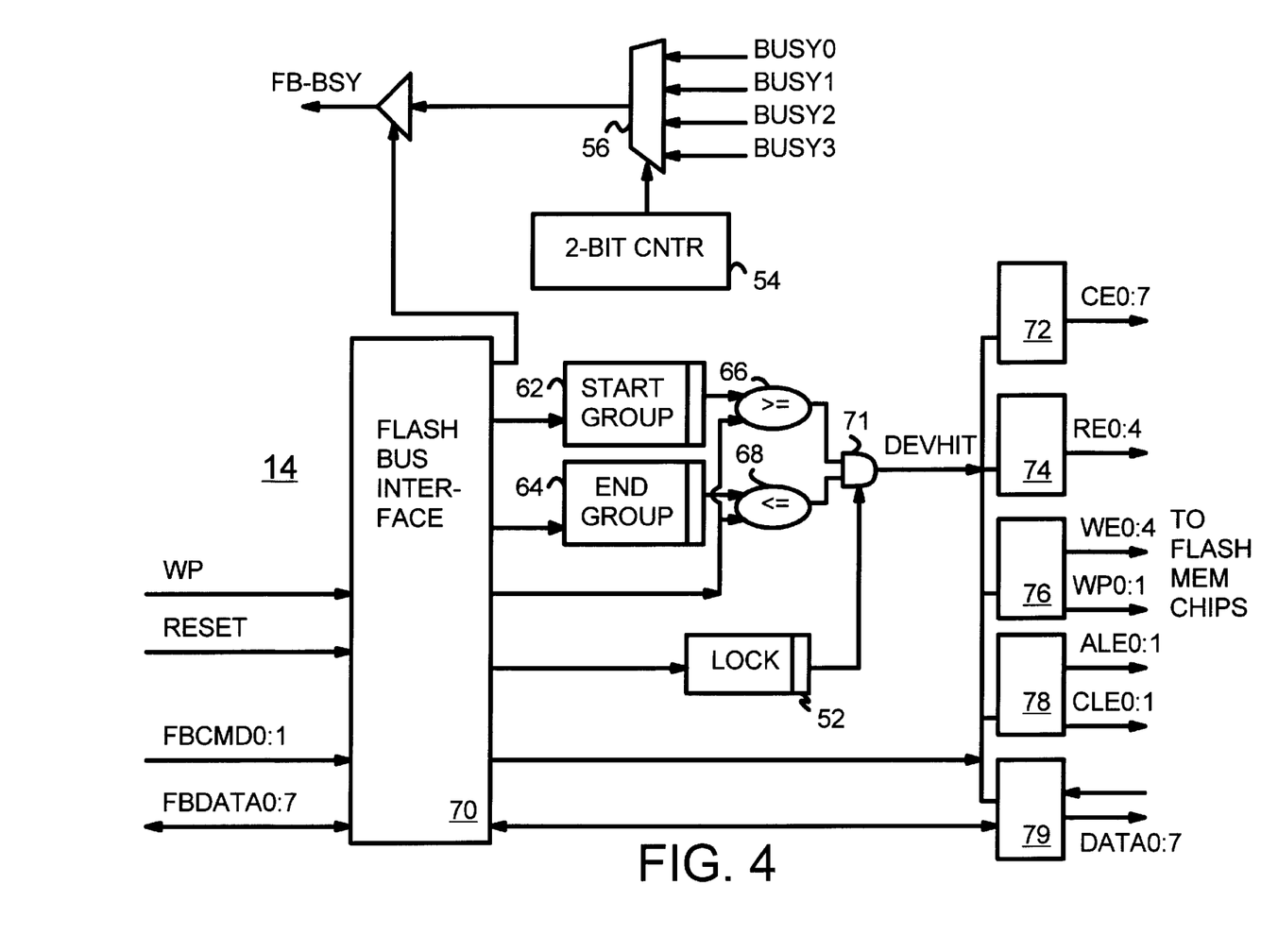
FIG. 4 is a diagram of a flash buffer chip for an expandable flash-memory system.

Flash Buffer Chip—FIG. 4

FIG. 4 is a diagram of a flash buffer chip for an expandable flash-memory system. Flash buffer chips allow a relatively large number of flash-memory chips to be added to the system without excessively loading the flash bus. Busy signals are combined by the flash buffer chips so that fewer busy signals need to be input to the DMA controllers.

Flash buffer chip 14 connects to a flash bus to receive commands, addresses, and data from the flash-specific DMA controller. The 8-bit data/address/command portion of the flash bus is passed through to output logic 79 and then on to the flash-memory chips. The 2-bit select and command portion of the flash bus are decoded by flash-bus interface 70, which includes state machines to keep track of multi-cycle command sequences.

The flash buffer chips also serve as protocol converters, taking the flash bus protocol and converting it to the protocol expected by the flash-memory chips. This could be as simple as converting flash bus commands in to the appropriate sequence of signal transitions to the flash-memory chips, or could involve translation of commands or addresses, or even more complex sequencing. In the preferred implementation, the commands on the flash bus are kept similar to those expected by the flash-memory chips to minimize the cost of conversion and thus keep the flash buffer chips simple.

Requests on the flash bus occur in one of two modes: initialization mode or normal mode. Selection of the request mode is controlled by a bit in the control field sent by the DMA controller during a request cycle. Initialization mode allows for configuration of the flash buffer chips by writing directly to an internal state in the flash buffer chips, while normal mode allows for communication with the flash-memory chips via the flash buffer chips.

In order to uniquely address each flash buffer chip on a flash bus for initialization mode requests, a geographical ID is provided which is unique for each flash buffer chip. The fixed identifier can be generated by a daisy chain that adds one to the value received by each flash buffer chip, when the first chip's input is zero. Using this scheme, the flash buffer chips on a flash bus can be addressed for initialization mode requests using sequential geographical IDs. Initialization mode requests are used to set starting address register 62 and ending address register 64 in each flash buffer chip so that all the flash-memory chips connected to each flash buffer chip on the flash bus can be uniquely addressed by normal mode requests.

Starting address register 62 and ending address register 64 in a flash buffer chip control the range of addresses for which the flash buffer chip will respond to normal mode requests. Firmware first configures a first flash buffer chip, whose geographical ID is zero, to respond to a wide range of addresses (setting the starting address register 62 to zero and the ending address register 64 to its maximum value). Firmware uses normal-mode requests to access flash-memory chips connected to the first flash buffer chip. Firmware can determine how many flash-memory chips are actually present. Firmware can then reset ending address register 64 on the first flash buffer chip to indicate the last flash-memory chip that is actually present. This process is then repeated by continuing to a second flash buffer chip, whose geographical ID is one, and setting its starting address register 62 to one more than the ending address register 64 of the first flash buffer chip. When this process has completed after initializing all the flash buffer chips, each will respond to normal mode requests to a unique and non-overlapping range of addresses corresponding to the flash-memory chips actually connected to each flash buffer chip.

In normal mode, a device address sent on the flash bus is compared to the starting address register 62 and the ending address register 64 in each flash buffer chip by comparators 66, 68. A device hit is signaled when the device address sent on the flash bus falls within the range indicated by the starting address register and the ending address register as determined by AND gate 71. When properly initialized, only a single flash buffer chip can generate a device hit in response to the device address sent on the flash bus with a normal mode request. When enabled by a lock bit in the control field sent by the DMA controller during a request cycle, internal state in the flash buffer chip will remember the device hit condition in lock register 52 so that subsequent request cycles on the flash bus do not have to continue sending the device address. This saves flash bus cycles. An OR gate (not shown) can be used to produce a device enable signal as the logical OR of the device hit signal and the remembered device hit condition in lock register 52. Lock register 52 can be cleared by a subsequent unlock request cycle sent by the DMA controller.

The device enable signal enables flash-control logic 72, 74, 76, 78, and output logic 79. Chip enables CE0:7 are generated for each of the eight flash-memory chips in a bank. Each of these chip enable signals are shared among four flash-memory chips, one in each of the four banks attached to the flash buffer chip. Flash-control logic 72 decodes a device address received from the DMA controller into one of the eight chip selects. Flash-control logic 74 generates read-enable RE0:3 strobes for each of the four banks, while Flash-control logic 76 generates write-enable WE0:3 strobes for each of the four banks and write-protect WP0:1 signals. Flash-control logic 78 generates address latch strobe ALE0:1 and command latch strobe CLE0:1, which are also shared among all chips in two banks. The write protect signals are determined by the stability and level of the power supply voltage and may be generated locally with each flash buffer chip, or are preferably provided from the flash bus and passed through by the flash buffer chip.

The busy signals from all flash-memory chips in a bank are connected together. When four banks are attached to a flash buffer chip, then four busy signals are received. These four busy signals are time-multiplexed onto a single busy line for the flash bus. The DMA controller monitors this shared busy line to determine when a flash-memory chip has completed its operation and is ready.

Counter 54 is a 2-bit counter than causes mux 56 to select one of the four busy signals from the four banks of flash chips. Each busy signal is selected by mux 56 once every four clock cycles. Mux 56 outputs a time-multiplexed busy signal that successively outputs each of the four busy signals.

Counter 54 also causes one of four enable signals (not shown) to be selected. This produces a time-multiplexed enable signal that controls when the time-multiplexed busy signal is allowed to drive the single flash-bus busy line. Providing for control of the enable of the flash bus busy line allows multiple flash-memory chips connected to different flash buffer chips to share the same time-multiplexed busy period under firmware control.

Figures 5, 6:
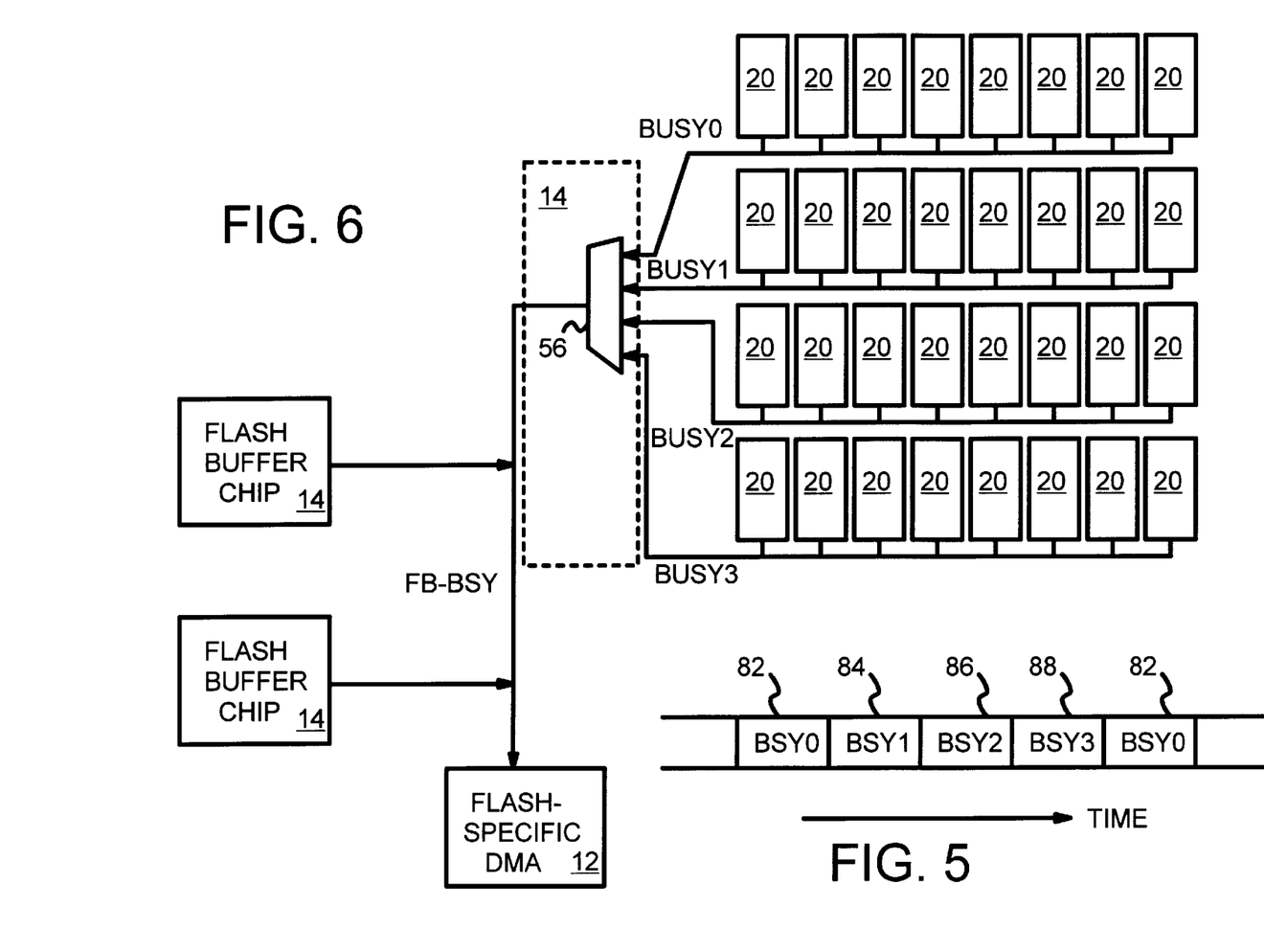
FIG. 5 is a timing diagram of a time-multiplexed busy signal.
FIG. 6 highlights the busy signals from the flash-memory chips to the flash-specific DMA controller.

Time-Multiplexed Busy Signal for Flash Bus—FIG. 5

FIG. 5 is a timing diagram of a time-multiplexed busy signal. A different one of the four busy signals is outputted to the flash bus during each clock period. During period 82, BUSY0 from bank 0 is output. BUSY1 from bank 1 is output in period 84, while BUSY2 for bank 2 is output for period 86. BUSY3 for the last bank is output for period 88, after which the sequence repeats with period 82 and BUSY0.

In the preferred implementation, counter 54 controlling mux 56 is synchronized among all flash buffer chips by a synchronous reset signal on the flash bus. Synchronizing counter 54 among all flash buffer chips on a flash bus ensures that the clock periods determined by counter 54 on each flash buffer chip correspond to the same time.

Busy Tree—FIG. 6

FIG. 6 highlights the busy signals from the flash-memory chips to the flash-specific DMA controller. Each bank of 8 flash-memory chips 20 drives a common busy signal. The four busy signals from four banks are input to flash buffer chip 14. Mux 56 in flash buffer chip 14 sequentially outputs the four busy signals over a four-cycle period as shown in FIG. 5.

Mux 56 outputs a time-multiplexed busy signal as the flash-bus busy line. Other flash buffer chips likewise drive the same flash-bus busy signal FB-BSY. Conflicts could occur if more than one flash buffer chip 14 drove the busy line at the same time. To prevent the conflict, only one of the flash buffer chips is selected by flash-specific DMA controller 12 for each of the four banks. However, different flash buffer chips can drive the flash busy line at different clock periods. DMA controller 12 can access bank one of one flash buffer chip, but bank 2 of another flash buffer chip, and bank three of still a third flash buffer chip. However, in the preferred implementation, DMA controller 12 cannot access bank one of one flash buffer chip and bank one of another flash buffer chip since a conflict occurs.

Flash Bus Protocol

The flash bus has an 8-bit address/data/command portion for commands, addresses, and data to the flash-memory chips. This 8-bit portion is typically passed through the flash buffer chips, although the flash buffer chips can translate commands and activate control signals to the flash-memory chips.

The flash bus also has a busy line, a clock and a reset signal, as well as a 2-bit portion for selecting and controlling the flash buffer chips. This 2-bit portion is not passed through to the flash-memory chips. The 2-bit portion is encoded as follows:

| | |
|---|---|
| 00 | New Request |
| 01 | Write |
| 02 | Read |
| 03 | Idle |

A high-level flash operation begins with a new request phase where the 2-bit portion is 00. The new request phase takes 2 cycles. On the first cycle of the new request phase, the 8-bit portion of the flash bus is used to encode the following information:

| | |
|---|---|
| bit 7 | normal = 1, initialization = 0 |
| bits 5:4 | 00 = data, 01 = command, 10 = address, 11 = disconnect |
| bit 3 | 1 = lock sequence |
| bits 1:0 | Interleave selection, one of four banks |

The second cycle of the new request phase sends a device address for one of the flash-memory chips connected to the flash buffer chips. The device address is compared to the starting address register and ending address register in each flash buffer chip and causes a device hit in exactly one flash buffer chip. All of the 8-bit portion is used for the device number. Combining both the 2-bit interleave selection field and the 8-bit device address, a total of 1024 flash-memory chips can be addressed on each flash bus.

When the lock bit of the first cycle of the new request phase is set, then all following accesses are locked to the selected flash buffer chip; other flash buffer chips ignore the following requests until a disconnect is signaled. This allows multiple requests to the same flash buffer chip to proceed without repeating the second cycle of the new request phase. Any first cycle with the lock bit clear will cause a disconnect. A special disconnect first cycle is provided so that a disconnect can be done independently from sending data, command, or address on the flash bus.

The initialization bit of the first cycle of the new request phase is set to communicate to the flash buffer chips with initialization mode requests rather than with normal mode requests. Initialization mode requests are used to load starting address register 62 and ending address register 64 in each flash buffer chip. The 8-bit portion of the flash bus is interpreted as follows when the initialization bit is set in the first cycle:

bits 5:4 01 starting address follows, 10=endingaddress follows bits 3:0 geographical address of the flash buffer chip to be loaded The following cycle sends either the starting or ending address over the 8-bit portion. The starting and ending addresses correspond to the first and last flash memory chips connected to the selected flash buffer chip.

The 2-bit portion of the flash bus indicates the type of information sent on the 8-bit portion in the following cycles—either a command for the flash-memory chips, an address, or data. In response, the flash buffer chip drives the appropriate control signals to the flash-memory chip. For example, when an address is sent, the address latch strobe ALE is pulsed, but when a command is sent, CLE is pulsed.

Below is an example of the use of the flash bus:

| Cmd | AddrBus | Meaning |
|---|---|---|
| 00 | 10011000 | 1st Request Phase; CTL = 01(cmd),LOCK, interleave 0 |
| 00 | 00000000 | 2nd Request Phase; Device Number = 0x00 |
| 01 | 00000000 | Write Cycle with cmd for device = read cmd |

-continued

| Cmd | AddrBus | Meaning |
|---|---|---|
| 00 | 10101000 | 1$^{st}$ Request Phase; CTL = 10(addr),LOCK,interleave 0 |
| 01 | xxxxxxxx | Write Cycle with 1$^{st}$ address byte for flash mem device |
| 01 | xxxxxxxx | Write Cycle with 2$^{nd}$ address byte for flash mem device |
| 01 | xxxxxxxx | Write Cycle with 3$^{rd}$ address byte for flash mem device |
| 00 | 10110000 | LOCK = 0 (release bus); CTL = 11 (disconnect) |

The flash-specific DMA controlling interleave 0 now pauses until the BUSY signal for interleave 0 is de-asserted. Then read cycles can begin as follows:

| | | |
|---|---|---|
| 00 | 10001000 | 1$^{st}$ Request Phase; CTL = 00(data);LOCK, interleave 0 |
| 00 | 00000000 | 2$^{nd}$ Request Phase; device number = 0x00 |
| 10 | yyyyyyyy | Read cycle. |

Other read cycles follow to transfer all 512 data bytes from the flash memory device.

Figure 7:
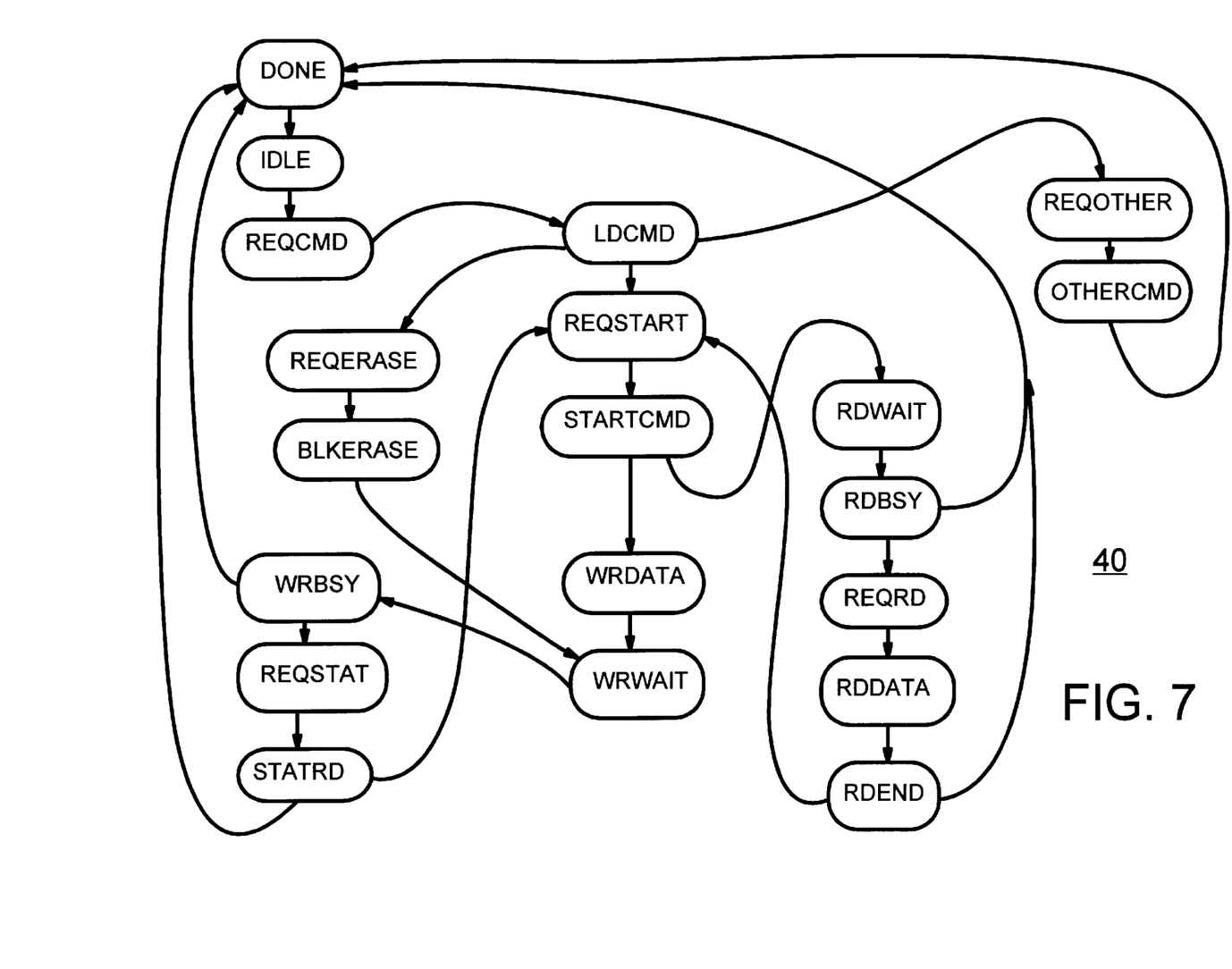
FIG. 7 is a state diagram of the flash-specific DMA state machines.

DMA State Machines—FIG. 7

FIG. 7 is a state diagram of the flash-specific DMA state machines. Four of the DMA state machines 40 are provided for each DMA controller to allow control of four separate devices. However, only one bus state machine is provided for each flash bus. The four DMA state machines 40 must arbitrate for control of the flash bus and thus the bus state machine. The DMA state machines can disconnect from the flash bus yet still monitor the busy signals from the flash-memory chips. Once the busy signal is changed to indicate that the flash-memory chip operation is completed, then the DMA state machine can again arbitrate for the flash bus and complete the flash operation. Disconnecting from the flash bus allows other DMA state machines to use the flash bus to perform other flash operations to other flash devices.

The DMA state machine 40 is reset to the DONE or IDLE states. When a host request is received, the REQCMD state is entered. The DMA state machine then arbitrates for control of the flash bus and the bus state machine, The command and address bytes are then sent to the flash buffer chip and the flash-memory chips using the bus state machine to sequence through several bus cycles. For erase operations, the LDCMD state leads to the REQERASE state. The DMA state machine then disconnects from the flash bus and waits for the busy signal to be de-asserted in the BLKERASE state. Only one of the four clock periods of the time-multiplexed busy signal is monitored, the clock period corresponding to the DMA state machine's interleave. For block erase, an entire block of 16 pages is erased with a single command.

For read or write cycles, the LDCMD state leads to the REQSTART state where the new request is sent to the flash buffer chip. The STARTCMD state then sends the command and address bytes to the flash-memory chips. For writes, the data is immediately sent in the WRDATA state and then the flash bus is disconnected and the DMA state machine monitors the busy signal in the WRWAIT and WRBSY states. When the busy signal is de-asserted many microseconds later, the write is checked by reading a status register on the flash-memory chip using the REQSTAT and STATRD states.

For read cycles, after the command and address bytes are sent to the flash-memory chips in the STARTCMD state, the busy line is monitored in the RDWAIT state. For higher-priority reads, such as for the host, the state machine may not disconnect from the flash bus; otherwise the flash bus is disconnected. Once the data is ready and the busy line changes to ready, the RDBSY state sequences to the REQRD state where a command to read the data from the flash-memory chip is sent to the flash buffer chip. The data is read to the DRAM cache in the RDDATA state and the read complete with the RDEND state.

Other kinds of requests such as read ID, reset, suspend, and resume are handled by the REQOTHER and OTHERCMD states. Error handling can be included by jumping back to the DONE state on an error. Block flash operations are performed by repeating state sequences 16 times so that all 16 pages are read or written. The bus state machine is called and released for each page operated on. This allows the flash bus to be released after each page is read or written, allowing other DMA state machines to have use of the flash bus.

Figure 8:
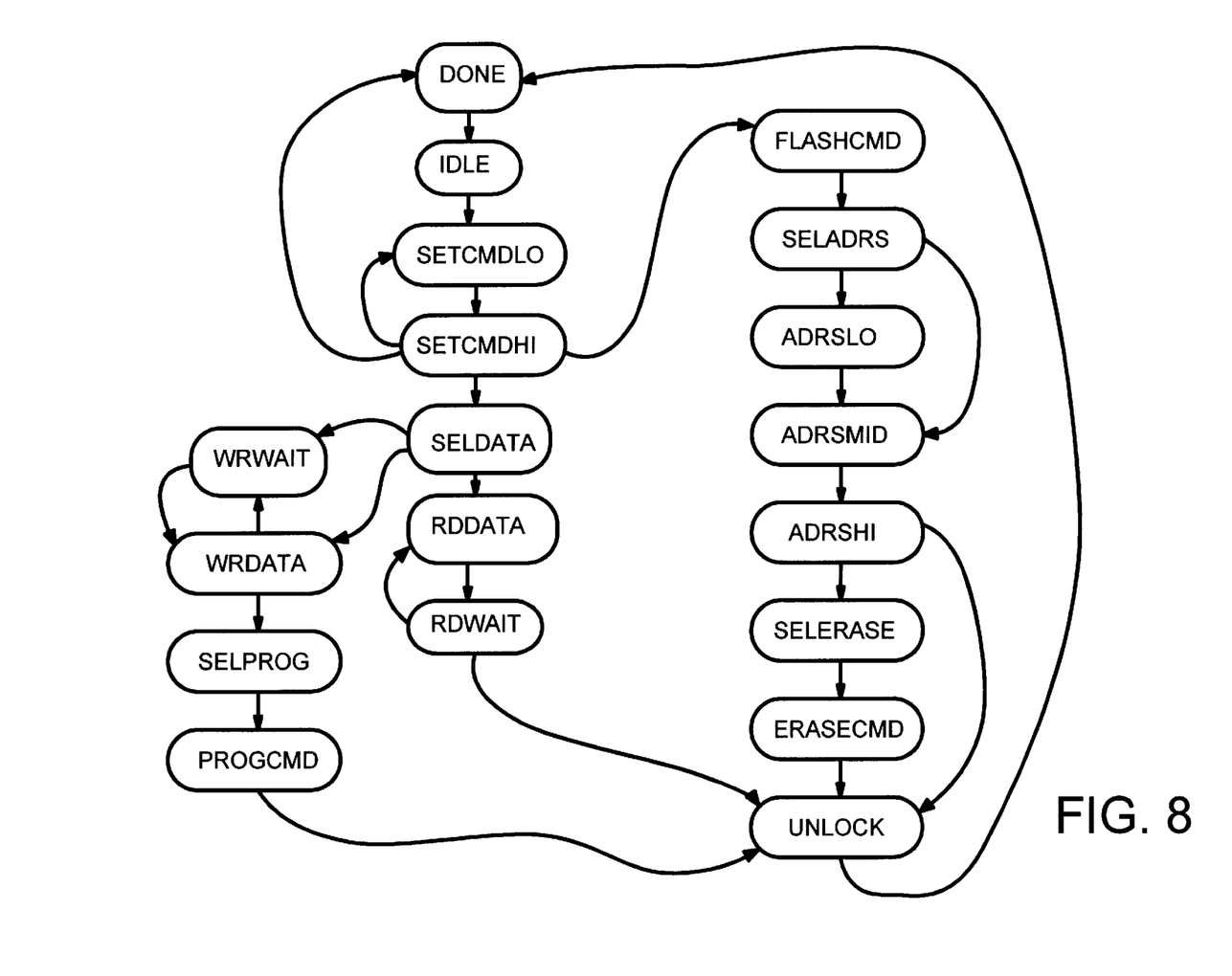
FIG. 8 is a state diagram of the flash bus state machine.

Flash Bus State Machine—FIG. 8

FIG. 8 is a state diagram of the flash bus state machine. While there are four DMA state machines for each flash bus, only one bus state machine is provided for each flash bus. The four DMA state machines arbitrate for use of the bus state machine to transfer commands, addresses, and data to the flash buffer and memory chips. The bus control state machine is contained inside each bus control logic 46, 48 of FIG. 3.

When a DMA state machine successfully arbitrates for the bus state machine, the address is retrieved and the new-request command phase cycles are performed in states SETCMDLO and SETCMDHI. For read cycles, the data is set up and transferred in states SELDATA and RDDATA. For a page read, 512 read cycles are required to transfer the 512 bytes of data, plus another 16 cycles for the 16 system overhead bytes stored with a flash page. A traditional DMA engine with start and stop pointers can be used for the data transfer. RDWAIT waits for the FIFO to be not full so that more data can be transferred from the flash-memory chip. For page-write operations, states WRDATA sends the data to the flash-memory chip while state WRWAIT waits for the FIFO to be not empty so that more data can be transferred to the flash-memory chip.. The success of the programming is checked by reading status registers on the flash-memory chip in states SELPROG and PROGCMD.

For erase operations, the erase command is sent to the flash-memory chip in state FLASHCMD, and up to three address bytes are sent in states ADRLO, ADRMID, ADRHI. The erase is initiated with a start erase command in states SELERASE, ERASECMD.

The flash bus is released by the UNLOCK state, where the cleared lock bit is sent out to the flash buffer chip. Some NO-OP cycles may be added and the status checked (not shown) before the bus state machine becomes idle.

Figure 9:
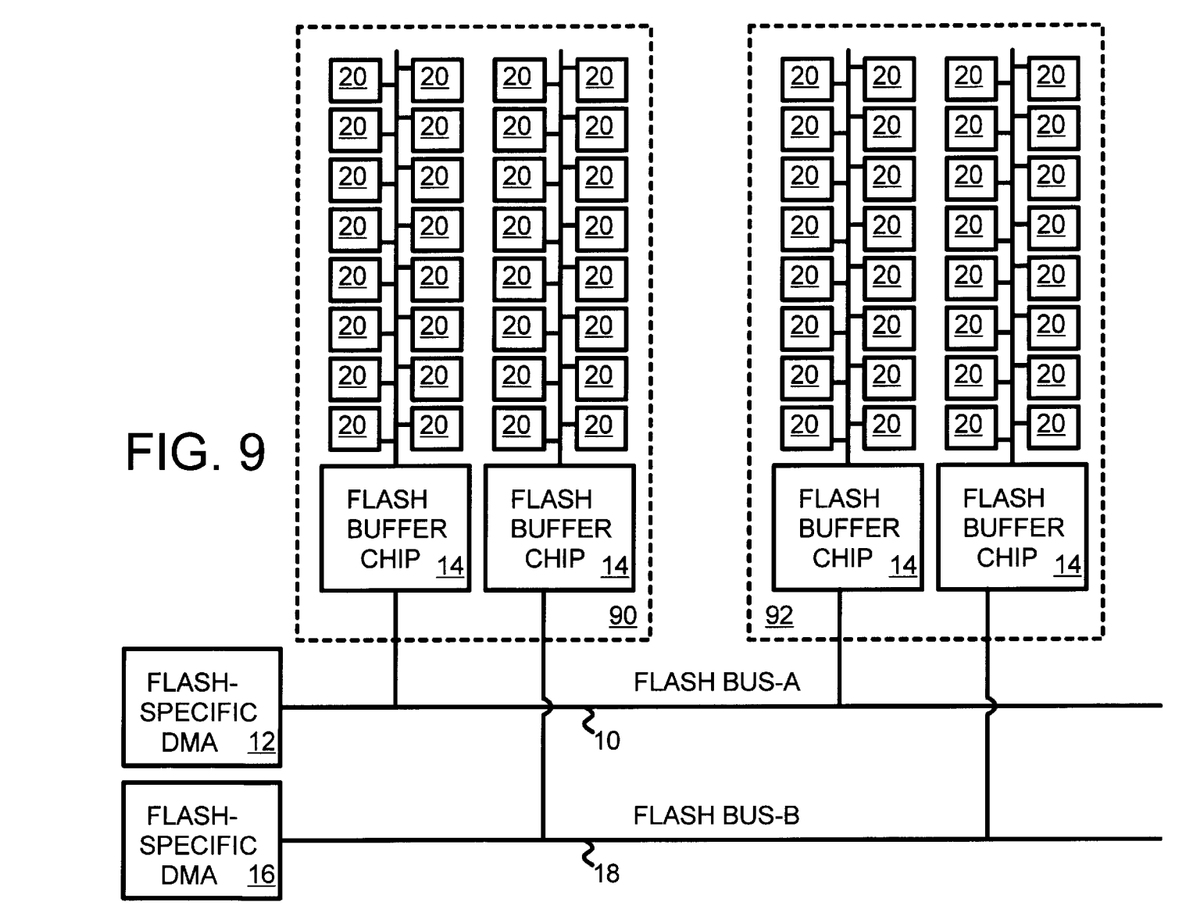
FIG. 9 illustrates expansion cards in a flash memory system.

Expansion Card Has Flash Buffer Chip—FIG. 9

FIG. 9 illustrates expansion cards in a flash memory system. Flash-specific DMA controllers 12, 16 control flash busses 10, 18, which are located on a system board. Some flash-memory chips and flash buffer chips (not shown) may be mounted on the system board and directly connected to flash busses 10, 18.

Flash expansion cards 90, 92 each contain two flash buffer chips 14 and several banks of flash-memory chips 20. Up to four banks of flash-memory chips 20 can be connected to each flash buffer chip 14, although only two banks are shown in FIG. 9.

One of the flash buffer chips 14 on each flash expansion card 90, 92 connects to flash bus 10, while the other flash buffer chip 14 connects to the other flash bus 18. Having each flash expansion card 90, 92 connect to both flash busses 10, 18 allows for expansion with maximum performance, since the flash memories are spread over both flash busses. This improves the likelihood that flash operations can be performed in parallel.

Flash expansion cards 90, 92 are plugged into sockets mounted on the system board. The flash-memory system is manufactured with several empty sockets. The user can later purchase additional expansion cards 90, 92 and insert these into the empty sockets. The future expansion cards can include modified flash buffer chips that modify their address and control signals for future flash chips with a higher capacity or additional features. The same expansion feature also benefits manufacture of flash disks, where one system board can be used to support flash disks of varying sizes by changing the number of expansion boards packaged with the system board.

ADVANTAGES OF THE INVENTION

The flash bus uses a minimum of pins and signal lines. The 8-bit portion is used for address, data, and commands to the flash-memory chips. Only two additional bits are used for commanding the flash buffer chips. Time-multiplexing among the interleaves allows a single busy line to be used. Thus the flash bus is a very economical bus.

An expandable architecture is provided by the flash busses. Additional banks of flash-memory chips can be added to existing flash buffer chips, or modules of flash-memory chips with a flash buffer chip can be plugged into a flash bus. The flash bus is an intermediate bus that facilitates expansion since any number of flash buffer chips can be added. Capacitive loading and busy-line chaining problems are overcome.

Performance is enhanced because two DMA controllers, each with four DMA state machines, are provided, able to launch two new flash operations at once for a total of eight independent flash operations in progress at one time. Once launched, flash operations are monitored by the DMA state machines, which receive the busy lines from the flash-memory chips via the flash buffer chips. Thus the DMA controller can launch additional flash operations to other flash-memory chips. This inherent parallelism improves performance by allowing multiple flash operations to be performed at the same time. Indeed, multiple flash operations can be launched or completed at the same time since two DMA controllers are provided.

The two levels of state machines is efficient yet allows multiple flash operations to occur at the same time. The four DMA state machines control long flash operations at a high level, while a single bus state machine controls the flash bus. The DMA state machines can monitor the busy line even when they don't currently have control of the flash bus. Time-multiplexing the busy line along interleave boundaries allows each interleave's DMA state machine to monitor progress. The inherent busy delay for slow flash operations is used to advantage to allow time for other requesters to use the flash bus. Releasing the flash bus while waiting for the busy signal improves performance by allowing the other DMA state machines to use the flash bus.

The flash-specific DMA controller allows commands and addresses to be input to the flash-memory chip over the shared data/address/command I/O pins. Expansion of storage capacity of a flash-memory system is provided by the flash bus and flash buffer chips. A high-performance flash-memory system performs flash operations in parallel, even when expansion flash chips are added. Hundreds or thousands of individual flash-memory chips can be installed on a system using the intermediate flash bus and the flash buffer chips.

Time-multiplexing of the busy signals increases the delay until a busy signal from a flash-memory chip is recognized by a DMA controller. However, the additional delay due to time-multiplexing is small when compared with the long flash operation.

ALTERNATE EMBODIMENTS

Several other embodiments are contemplated by the inventors. For example additional flash busses can be added along with additional DMA controllers. DMA controllers could be dynamically assigned to flash busses or to interleaves rather than fixed. The flash bus can be expanded beyond the basic byte-wide interface to improve bandwidth. Some of the intelligence of the flash-specific DMA controllers can be moved into the flash buffer chips to improve performance. Suspend and resume of flash operations could be supported, allowing higher-priority host requests to be accelerated in priority.

While the term "NVRAM" is widely used, it is somewhat of a misnomer since flash memory is not truly random-access. While reads can be to random pages, writes require that larger blocks be erased. Many variations of the logic can be used. The partitioning of logic can be varied, allowing two or more flash buffer chips to be merged onto a single silicon substrate.

The flash buffer chips can include translation logic to translate the command and address bytes received into a format for a particular type of flash-memory chip. For example, higher-capacity flash-memory chips require more address bits than smaller-capacity chips. The flash buffer chip can re-arrange address bits for use with the higher-capacity flash-memory chips. Some flash-memory chips may require that control signals such as write or read strobes be pulsed, while others requires that these controls be left active for several micro-seconds while the flash operation is being processed within the flash-memory chip. The flash buffer chip can accommodate these different requirements of specific types of flash-memory chips by translating signals.

A more complex implementation could have the command sent to the flash buffer chip by the DMA controller include information indicating which clock period to use for transmitting the busy condition for that operation. This puts the association between the bank number and the clock period under firmware control. An alternative to sockets on the system board is to have the flash expansion cards cascade—each additional flash expansion card plugs in to the previous one, thus extending the flash bus as more cards are added.

The foregoing description of the embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

We claim:

1. An expandable flash-memory system comprising:
   a host interface for receiving requests for access of flash memory;
   a flash-specific direct-memory access (DMA) controller, responsive to the requests from the host interface, for controlling access of the flash memory, the flash-specific DMA controller generating a sequence of command bytes followed by address bytes to initiate a data transfer from the flash memory;

a flash bus, coupled to the flash-specific DMA controller, the flash bus having shared lines, the shared lines for transmitting the sequence of command bytes and address bytes from the flash-specific DMA controller, the shared lines also transmitting data bytes from the flash-specific DMA controller for storage in the flash-memory system;

flash buffer chips, coupled to the flash bus, for generating control signals for controlling flash-memory chips, the flash buffer chips passing the sequence of command bytes and address bytes from the flash-specific DMA controller to the flash memory;

a plurality of flash-memory chips, the flash-memory chips arranged in banks sharing some of the control signals from a flash buffer chip, the flash-memory chips being non-volatile semiconductor-memory chips that retain data when power is no longer applied;

wherein the flash bus accepts additional flash-memory chips attached through the flash buffer chips for expanding a storage capacity of the expandable flash-memory system, whereby the flash-memory chips are buffered by the flash buffer chips to the flash bus and the flash-specific DMA controller.

2. The expandable flash-memory system of claim 1 wherein the flash bus further comprises command lines, the command lines for indicating transmission of a select code to the flash buffer chips, and wherein the flash buffer chips each further comprise a select decoder, receiving the select code, for generating a plurality of chip-enable control signals to the flash-memory chips, one of the chip-enable control signals being activated to enable a selected flash-memory chip while other chip-enable control signals disable other flash-memory chips, whereby the chip-enable control signals are generated by the flash buffer chips from the select code from the flash-specific DMA controller.

3. The expandable flash-memory system of claim 2 wherein each flash-memory chip outputs a busy signal to indicate when a flash operation is in progress within the flash-memory chip;

wherein all busy signals from flash-memory chips in a bank connected to a flash buffer chip are connected to a common bank-busy line, the bank-busy line for each bank input to the flash buffer chip;

the flash buffer chip further comprising:

busy combining means, receiving the bank-busy signals from all banks of flash-memory chips attached to the flash buffer chip, for combining the bank-busy signals into a merged busy signal output to the flash bus, whereby busy signals from individual flash-memory chips are combined by the flash buffer chips.

4. The expandable flash-memory system of claim 3 wherein the merged busy signals from all flash buffer chips on the flash bus are connected to a common flash-bus busy line, wherein the flash-specific DMA controller monitors the common flash-bus busy line to determine when the flash operation is in progress in the flash-memory chip, whereby all busy signals are combined into a single busy line to the flash-specific DMA controller.

5. The expandable flash-memory system of claim 4 wherein the busy combining means in the flash buffer chips comprises:

a multiplexer, receiving the bank-busy lines for all banks attached to the flash buffer chip, for successively outputting a different one of the bank-busy lines as the merged busy signal output to the flash bus;

a counter, coupled to control the multiplexer, for counting in a modulo equal to a number of banks attached to the flash buffer chip, whereby each of the bank-busy lines is output for a different period of time by the multiplexer.

6. The expandable flash-memory system of claim 5 wherein the flash-specific DMA controller comprises:

DMA state machines for controlling access of a flash-memory chip, the DMA state machine monitoring the flash-bus busy line to determine when the flash operation is still in progress in the flash-memory chip; and a first-in-first-out memory for storing the data bytes to and from the flash bus;

wherein a number of DMA state machines is equal to a number of banks attached to a flash buffer chip.

7. The expandable flash-memory system of claim 6 further comprising:

a bus state machine, in the flash-specific DMA controller, for generating the sequence of command bytes and address bytes to the flash bus in response to a DMA state machine accessing a flash-memory chip, whereby one bus state machine drives the flash bus for multiple DMA state machines.

8. The expandable flash-memory system of claim 5 further comprising:

a second flash bus;

a second flash-specific DMA controller coupled to the second flash bus and coupled to the host interface;

a second plurality of flash buffer chips coupled to the second flash bus, each flash buffer chip in the second plurality generating control signals and buffering command and address bytes from the second flash bus to additional banks of flash buffer chips, whereby the second flash bus accesses the additional banks of flash buffer chips.

9. The expandable flash-memory system of claim 8 further comprising:

expansion sockets, coupled to the flash bus and coupled to the second flash bus, for receiving expansion cards, each expansion card having a first flash buffer chip connected to the flash bus, and a second flash buffer chip connected to the second flash bus, the expansion card having banks of flash-memory chips attached to either the first flash buffer chip or to the second flash buffer chip, whereby storage capacity is symmetrically expandable by the expansion cards connected to both the flash bus and to the second flash bus.

10. A flash-memory storage peripheral comprising:

a host interface to a host system;

a local processor for controlling the flash-memory storage peripheral;

a read-only memory (ROM), coupled to the local processor, for storing routines for execution by the local processor, the routines including wear-leveling routines for re-mapping data from over-used or faulty memory blocks to under-used or unused memory blocks;

a cache, coupled to the local processor, for temporarily storing data from the host in volatile memory that loses data when power is disconnected;

a first flash-specific DMA controller, coupled to the local processor, for generating command, address, and data sequences to a first flash-memory chip in a format required by the first flash-memory chip;

a first flash bus, coupled to the first flash-specific DMA controller, for transferring data, address, and commands over shared address/data/command lines;

a first flash buffer chip, coupled to the first flash bus, for sending the data, address, and commands from the shared lines of the first flash bus to the first flash-memory chip;

a plurality of other flash-memory chips, arranged into banks, the flash-memory chips being non-volatile semiconductor memory chips that retain data when power is lost;

other flash buffer chips coupled to the first flash bus, each flash buffer chip coupled to a different plurality of banks of the flash-memory chips;

a second flash-specific DMA controller, coupled to the local processor, for generating command, address, and data sequences to a second flash-memory chip in a format required by the second flash-memory chip;

a second flash bus, coupled to the second flash-specific DMA controller, for transferring the data, address, and commands over shared address/data/command lines;

a second flash buffer chip, coupled to the second flash bus, for sending the data, address, and commands from the shared lines of the second flash bus to the second flash-memory chip;

other flash buffer chips coupled to the second flash bus, each flash buffer chip coupled to a different plurality of banks of the flash-memory chips, whereby two flash-specific DMA controllers control access of flash-memory chips through flash buffer chips connected by two flash buses.

11. The flash-memory storage peripheral of claim 10 wherein the first flash bus further comprises select lines for indicating when an identifier is being sent over the shared address/data/command lines, the identifier selecting one of the flash buffer chips as the first flash buffer chip;

wherein the second flash bus further comprises select lines for indicating when an identifier is being sent over the shared address/data/command lines, the identifier selecting one of the flash buffer chips as the second flash buffer chip, whereby the select lines select a flash buffer chip for accessing a flash-memory chip.

12. The flash-memory storage peripheral of claim 10 wherein each flash buffer chip includes combining means for combining busy signals from each bank of flash-memory chips attached to the flash buffer chip, the busy signals indicating when a flash operation has completed, each flash buffer chip outputting a single busy signal;

wherein the first flash bus further comprises a flash-bus busy line, coupled to the single busy signal from all flash buffer chips connected to the first flash bus, and wherein the second flash bus further comprises a second flash-bus busy line, coupled to the single busy signal from all flash buffer chips connected to the second flash bus, whereby busy signals are combined by the flash buffer chips.

13. The flash-memory storage peripheral of claim 12 wherein the combining means combines busy signals by time-division multiplexing.

14. The flash-memory storage peripheral of claim 12 wherein each of the first flash-specific DMA controller and the second flash-specific DMA controller comprises:

DMA state machines for controlling access of a flash-memory chip, the DMA state machine monitoring the flash-bus busy line to determine when the flash operation has completed in the flash-memory chip;

wherein a number of DMA state machines is equal to a number of banks attached to a flash buffer chip.

15. The flash-memory storage peripheral of claim 14 further comprising:

a bus state machine, in each of the first flash-specific DMA controller and the second flash-specific DMA controller, for generating the command and address bytes to the flash bus in response to a DMA state machine accessing a flash-memory chip, whereby one bus state machine drives the flash bus for multiple DMA state machines.

16. The flash-memory storage peripheral of claim 15 wherein each DMA state machine included disconnect means, responsive to the flash-bus busy line, for releasing the bus state machine and releasing control of the first or second flash bus when the flash operation has not yet completed, whereby other DMA state machines can use the first or second flash bus to access other flash-memory chips while the flash operation has not yet completed.

17. The flash-memory storage peripheral of claim 16 wherein each DMA state machine can access only one of the banks attached to each flash buffer chip and cannot access other banks attached to each flash buffer chip.

18. A flash storage system comprising:

a flash-specific direct-memory access (DMA) controller having a DMA state machine for each interleave of a flash memory, the flash memory being organized into an interleave number of interleaves for parallel access;

a flash bus having a narrow interface;

a bus state machine for driving command, address, and data bytes onto the flash bus in response to one of the DMA state machines;

banks of flash-memory chips, the flash-memory chips being non-volatile electrically-erasable-programmable read-only-memory EEPROM integrated circuits, the flash-memory chips being organized as pages of at least 512 bytes, and further organized into blocks of at least 16 pages, the flash-memory chips allowing no less than a page to be read or written and no less than a block to be erased; and flash buffer chips connected to the flash bus, each flash buffer chip connected to a number of banks of the flash-memory chips equal to the interleave number, the flash buffer chips including a decoder for generating a plurality of chip enables for the flash-memory chips connected to the flash buffer chip, the decoder activating one of the chip enables in response to a select code from the DMA state machine;

wherein the flash buffer chips pass the command, address, and data bytes from the flash bus through to the flash-memory chips, whereby the flash-specific DMA controller controls a large number of the flash-memory chips through the flash bus and the flash buffer chips.

19. The flash storage system of claim 18 wherein a DMA state machine releases the flash bus and the bus state machine while the flash-memory chip is busy performing a flash operation, the DMA state machine later re-acquiring the flash bus and the bus state machine when the flash-memory chip de-activates a busy signal, whereby the DMA state machines control flash operations in parallel.

20. The flash storage system of claim 19 wherein all busy signals from flash-memory chips in a bank connected to a flash buffer chip are connected to a common bank-busy line, the bank-busy line for each bank input to the flash buffer chip;

the flash buffer chip further comprising:

busy combining means, receiving the bank-busy signals from all banks of flash-memory chips attached to the flash buffer chip, for combining the bank-busy signals into a merged busy signal output to the flash bus, whereby busy signals from individual flash-memory chips are combined by the flash buffer chips.

21. A flash-memory system comprising:

a host interface for receiving requests for access of flash memory;

a flash-specific direct-memory access (DMA) controller, responsive to the requests from the host interface, for controlling access of the flash memory, the flash-specific DMA controller generating a sequence of command bytes and address bytes to initiate a data transfer from the flash memory;

a flash bus, coupled to the flash-specific DMA controller, the flash bus having shared lines, the shared lines for transmitting the sequence of command bytes and address bytes from the flash-specific DMA controller, the shared lines also transmitting data bytes from the flash-specific DMA controller for storage in the flash-memory system;

a plurality of flash-memory chips, the flash-memory chips arranged in banks sharing one or more control signals, each flash-memory chip outputting a busy signal to indicate when a flash operation is in progress within the flash-memory chip, wherein all of the busy signals from the flash-memory chips in a bank are connected to a common bank-busy line;

wherein the flash-specific DMA controller includes a busy-detector to monitor the common bank-busy line to determine when the flash operation is in progress in the flash-memory chip, whereby the flash-specific DMA controller provides the sequence of command bytes and address bytes onto the shared lines of the flash bus that also transmit the data bytes, the flash-specific DMA also monitoring progress of the flash operation using the common bank-busy line.

22. The flash-memory system of claim 21 further comprising:

flash buffer chips, coupled to the flash bus, for generating control signals for controlling the flash-memory chips, the flash buffer chips passing the sequence of command bytes and address bytes from the flash-specific DMA controller to the flash memory chips;

wherein the flash bus accepts additional flash-memory chips attached through the flash buffer chips for expanding a storage capacity of the expandable flash-memory system, whereby the flash-memory system is an expandable flash-memory system.

23. The flash-memory system of claim 21 wherein the flash buffer chips further comprise:

busy combining means, receiving the common bank-busy signals from a plurality of banks of flash-memory chips, for combining the bank-busy signals into a merged busy bus, the merged busy bus coupled to the flash-specific DMA controller, and wherein the flash-specific DMA controller further comprises:

DMA state machines for controlling access of a selected flash-memory chip in the plurality of flash-memory chips, the DMA state machine monitoring the merged busy bus to determine when the flash operation is still in progress in the selected flash-memory chip; and a first-in-first-out memory for storing the data bytes to and from the flash bus;

wherein a number of DMA state machines is equal to a number of banks of flash-memory chips.

24. The expandable flash-memory system of claim 23 further comprising:

a bus state machine, in the flash-specific DMA controller, for generating the sequence of command bytes and address bytes to the flash bus in response to a DMA state machine accessing the selected flash-memory chip, whereby the bus state machine drives the flash bus for multiple DMA state machines.

* * * * *